United States Patent [19]

Arends

[11] Patent Number: 4,509,909

[45] Date of Patent: Apr. 9, 1985

[54] CLAMP MECHANISM FOR DIFFERENTIAL PRESSURE THERMOFORMER

[75] Inventor: Albert W. Arends, Gladwin, Mich.

[73] Assignee: Leesona Corporation, Beaverton, Mich.

[21] Appl. No.: 484,858

[22] Filed: Apr. 14, 1983

[51] Int. Cl.³ .............................................. B29C 17/00
[52] U.S. Cl. ..................................... 425/388; 425/346; 425/387.1; 425/398; 425/416; 425/DIG. 48
[58] Field of Search .................... 425/346, 349, 302.1, 425/387.1, 388, 394, 398, 397, 400, 416, DIG. 48

[56] References Cited

U.S. PATENT DOCUMENTS

| Re. 27,881 | 1/1974 | Brown et al. | 425/388 X |
|---|---|---|---|
| 3,105,270 | 10/1963 | Tibish | 425/400 X |
| 3,172,159 | 3/1965 | Edwards | 425/398 X |
| 3,268,952 | 8/1966 | Shelby | 425/398 X |
| 3,341,895 | 9/1967 | Shelby | 425/DIG. 48 |
| 3,496,257 | 2/1970 | Brown et al. | 425/388 X |
| 3,507,007 | 4/1970 | Martin | 425/388 |
| 3,600,753 | 8/1971 | Otto | 425/388 |
| 3,650,655 | 3/1972 | Santouris | 425/416 X |
| 4,105,386 | 8/1978 | Thiel et al. | 425/387.1 X |
| 4,158,539 | 6/1979 | Arends et al. | 425/398 X |
| 4,255,382 | 3/1981 | Arends et al. | 425/388 X |

Primary Examiner—J. Howard Flint, Jr.
Attorney, Agent, or Firm—Learman & McCulloch

[57] ABSTRACT

A mechanism for clamping a web of thermoplastic material against the face of a female mold prior to closure of the mold includes a clamping ring assembly mounted on the machine frame for movement relative to the frame independently of the molds. The clamping assembly is driven to and from its web clamping position by a cam mounted on the rock shaft which drives the molds between their open and closed positions and a constant radius section on the cam holds the clamp in its clamping position throughout a substantial portion of the operating cycle.

8 Claims, 5 Drawing Figures

CLAMP MECHANISM FOR DIFFERENTIAL PRESSURE THERMOFORMER

BACKGROUND OF THE INVENTION

The present invention is especially directed to differential pressure thermoforming machines of the type wherein cup-shaped articles are formed in a web of thermoplastic material. Specific examples of machines of the type to which the present invention may be applied, are those disclosed in U.S. Pat. Nos. 3,496,257, 3,172,159, and 4,255,382.

Thermoforming machines of the type with which the present invention are concerned typically have opposed male and female mold or matched die members which are vertically reciprocated cyclically between the mold open and mold closed position. When the two molds are in their mold open position, an associated web feeding mechanism feeds a web of thermoplastic material between the two molds, while the molds are in their open position. Typically, one of the female molds is formed with a cavity, or a series of mold cavities, having associated vacuum ports, and the male mold member is formed with a plug assist, or a series of projecting plug assist members, which, as the molds are moved toward their mold closed position, press the aligned portions of the heated and deformable thermoplastic web into the respective cavities in the female mold.

In order to achieve uniform thickness in the finished article, it is customary to clamp the web against the face of the female mold around the periphery of the area in which the mold cavities are located, and around each cavity, at a point in the cycle before the plug assist members begin to deform the sheet. With such a clamping action, deformation of the sheet is confined to that portion of the sheet within the clamp periphery.

Because the clamping action must take place before, or at the time, the plug assist members engage the thermoplastic web, it is common practice in this field to mount the clamping ring device upon the male mold member so that it is engaged to clamp the web by the initial movement of the male mold from its open position toward its closed position. Because the male mold must continue to move toward the female mold after the clamping ring device is engaged, the usual practice is to mount the clamping ring device upon the male mold either by springs, or fluid pressure cylinders which act as springs, to accomodate the necessary relative movement between the clamping ring device and male mold after the clamping ring device has been engaged with the web to clamp it against the female mold. The subsequent relative motion compresses the springs or fluid in the fluid cylinders substantially as the molds are being closed and, upon closure of the molds it is necessary that the molds be held in their closed position for the period of time necessary to complete the forming operation. Thus, a substantial amount of power is required to overcome the spring forces urging the mold open throughout the forming operation.

The present invention is especially directed to an arrangement in which a clamping ring device of the type described above is mounted for movement entirely independently of the molds, and is driven to and from, and maintained in its clamping position, by a cam means which does not require the continued application of power to hold the clamp in its clamped position during the forming operation.

SUMMARY OF THE INVENTION

In the aforementioned U.S. Pat. No. 4,255,382, the upper and lower molds are cyclically driven to and from their rest positions by a drive mechanism which includes a rock shaft which is driven in oscillation through substantially less than a full revolution. In accordance with the present invention, a clamping ring assembly including a base plate is mounted for vertical reciprocatory movement on the machine frame independently of the upper and lower molds and is driven in vertical reciprocatory movement by means of a cam mounted upon the aforementioned rock shaft of the mold drive mechanism. The cam is provided with a constant radius or dwell section which holds the base plate at its elevated uppermost position throughout a substantial portion of each cycle of rotary oscillation of the rock shaft. A clamping ring device, through which the lower or male plug can freely pass, is supported above the base plates by a plurality of vertical support rods which includes a spring coupling to permit a slight vertical movement of the clamp ring device relative to the base plate.

The cam which drives the base plate has a variable radius section which raises and lowers the clamp assembley consisting of the base plate, support rods and clamping ring device in syncvhronism with the opening and closing of the molds to cause the clamp ring device to clamp the web against the lower face of the upper or female mold at the beginning of the mold closing cycle.

Other objects and features of the invention will become apparent by reference to the following specification and to the drawings.

IN THE DRAWINGS

Figure 3:
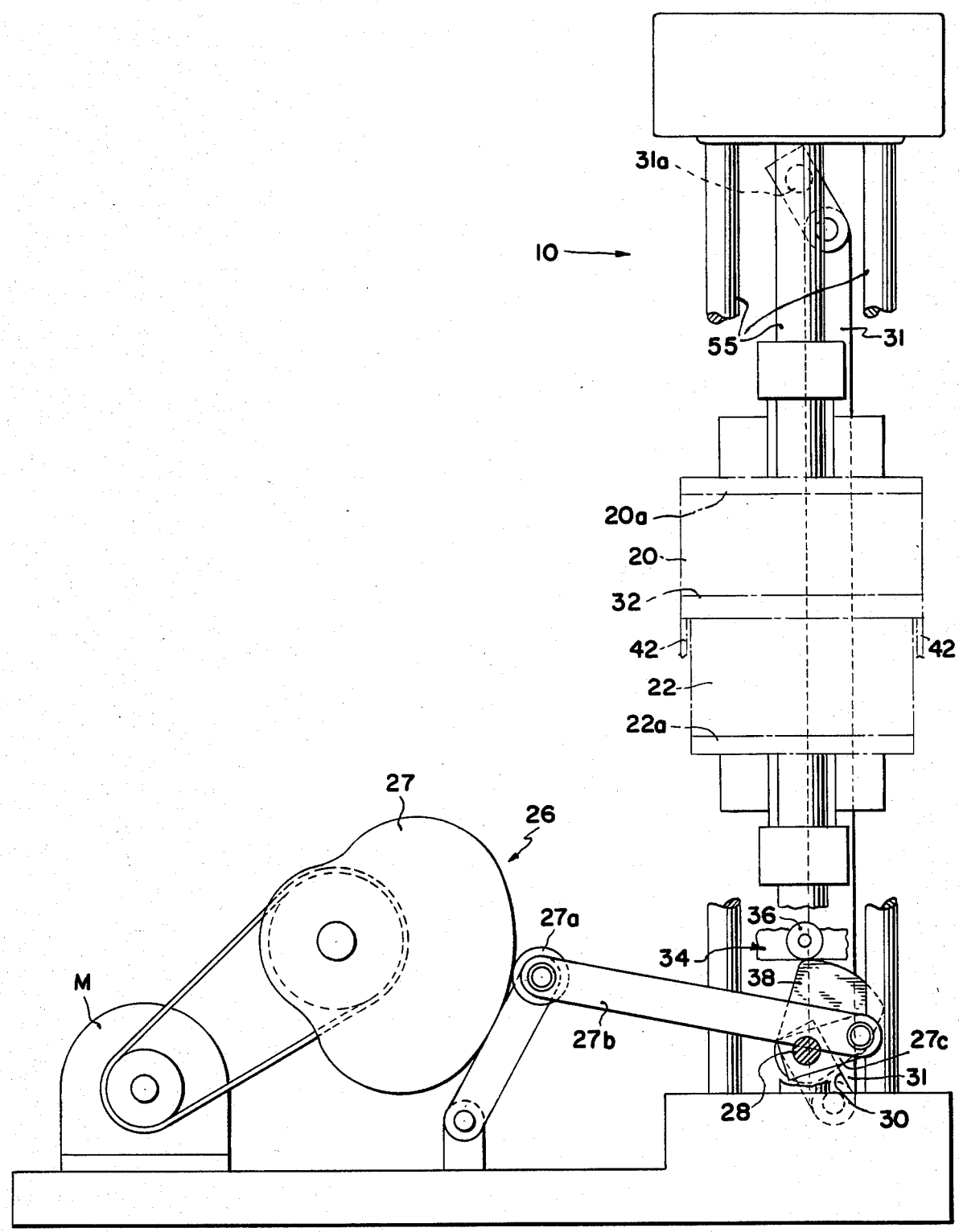
FIG. 3 is a side elevational view, with certain parts broken away, or shown in section, of the machine of FIG. 1.

Referring first to FIG. 3, there is shown in that figure a side elevational view of a thermoforming machine designated generrlly 10 which, with the exceptions of certain improvements to be described in detail below, is, for purposes of convenience, disclosed as substantially the same machine which is described in detail in the aforementioned U.S. Pat. No. 4,255,382.

The machine 10 includes an upper mold 20 and a lower mold 22, which are mounted on platens 20a and 22a for vertical reciprocatory movement upon the machine frame 24, and are shown in their mold closed position in FIG. 3. A drive mechanism designated generally 26 including motor M and a continuously driven drive cam 27 is employed to drive mold platens 20a and 22a in cyclic movement between the closed position shown in FIG. 3 and an open position (shown in FIG. 2). In that the drive mechanism 26, and its operation in cyclically opening and closing molds 20 and 22, is described in detail in U.S. Pat. No. 4,255,382, a detailed description of the drive mechanism will not be here repeated other than to note that the drive mechanism includes a rock shaft 28, linked to drive platen 22a, and mounted in the machine frame 24 to be driven in rotary oscillation via follower 27a, and links 27b, and 27c. The rotary oscillation of shaft 28 is translated by a linkage partially seen at 30 into the required vertical reciprocatory movement of the upper and lower molds 22. The rocking movement is transmitted to upper platen 20a via connecting links 31 and an upper rock shaft 31a, driven thereby, which is linked to drive platen 20a. For further details, please see U.S. Pat. No. 4,255,382, whose disclosure is incorporated herein by reference.

The present invention is especially directed to a clamping assembly, only partially indicated in FIG. 3 for the sake of clarity, which includes a clamping ring device 32 and a clamping ring base plate assembly generally designated 34. The clamp ring device 32 may comprise connected individual clamp rings 32a which surround each mold cavity. Cam followers 36, mounted on the base plate assembly 34, are engaged with a cam 38 fixedly mounted upon rock shaft 28 of the mold drive mechanism. Further details of the clamping assembly are disclosed in FIGS. 1, 2, 4, and 5.

Figure 2:
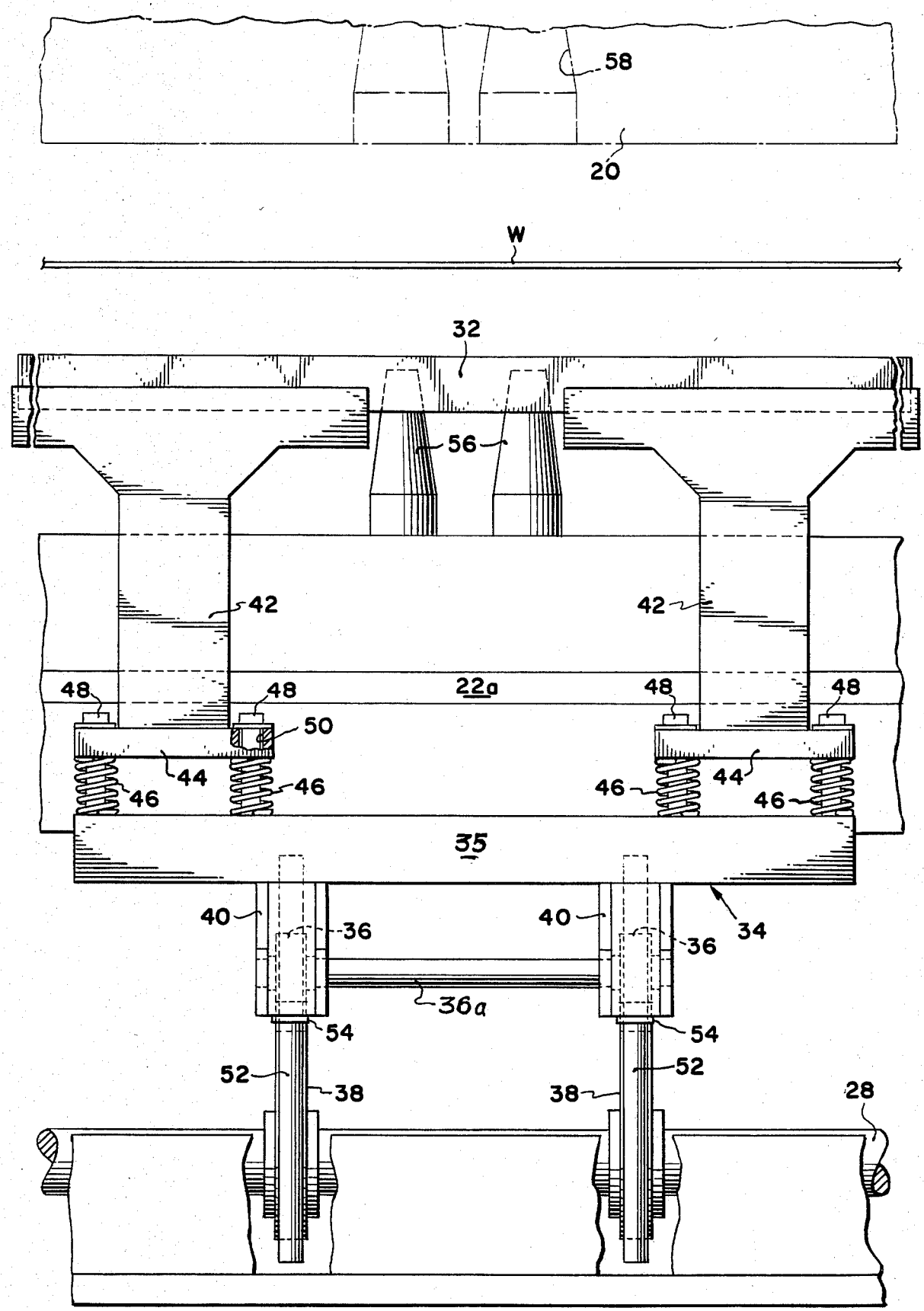
FIG. 2 is an end elevational view, with certain parts broken away, or shown in section, of generally the same portion of the machine as shown in FIG. 1.

Referring first to FIG. 2, the mold elements 20 and 22 of the machine of FIG. 3 are shown in the mold open position. A web W of thermoplastic material passes freely between the open molds and is cyclically advanced, in synchronism with the opening of the molds, to advance a fresh section of the web between the molds while the molds are open. The conveying chains C disclosed in U.S. Pat. Nos. 3,406,257 or 4,194,663, which are also incorporated herein by reference, may be used to incrementally advance the sheet or web W following each cycle when drive cam 27 is in a dwell position.

The clamping assembly referred to above is shown in more detail in FIG. 2, and it is seen in that Figure, that the assembly 34 includes support rails 35 which have a pair of downwardly projecting brackets 40, each of which rotatably supports a cam follower roller 36 for free rotation on a shaft 36a. The follower rollers 36 rest upon the surfaces of a pair of cams 38 which are identical, and which are both fixedly secured to rock shaft 28 of the mold drive mechanism.

Clamping ring device 32 is supported by support posts 42 located adjacent each of the four corners of the rails 35. Support posts 42 are fixedly secured at their upper ends to clamp ring device 32 and a platform 44, fixedly mounted at the lower end of each support post 42, rests upon a pair of compression springs 46 engaged between each platform 44 and the end of a rail 35. The springs 46 are retained in position by headed studs 48 which freely pass through bores 50 in platforms 44 and are threadedly received within rails 35, the studs passing axially through the springs 46 and being provided with enlarged heads which clamp the platforms 44 against the tops of springs 46.

Figure 1:
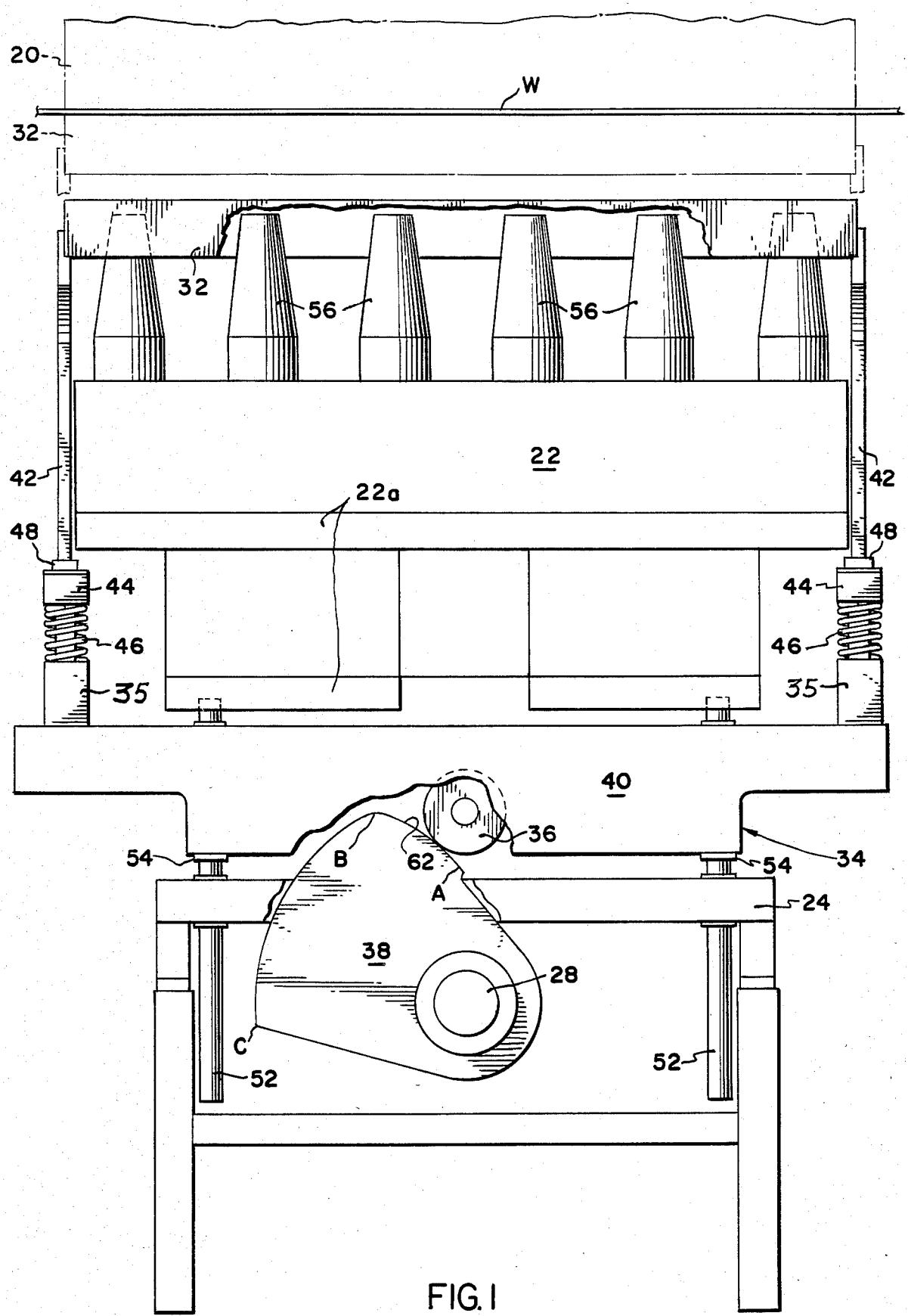
FIG. 1 is a side elevational view, with certain parts broken away of a portion of a thermoforming machine embodying the present invention.
Figure 4:
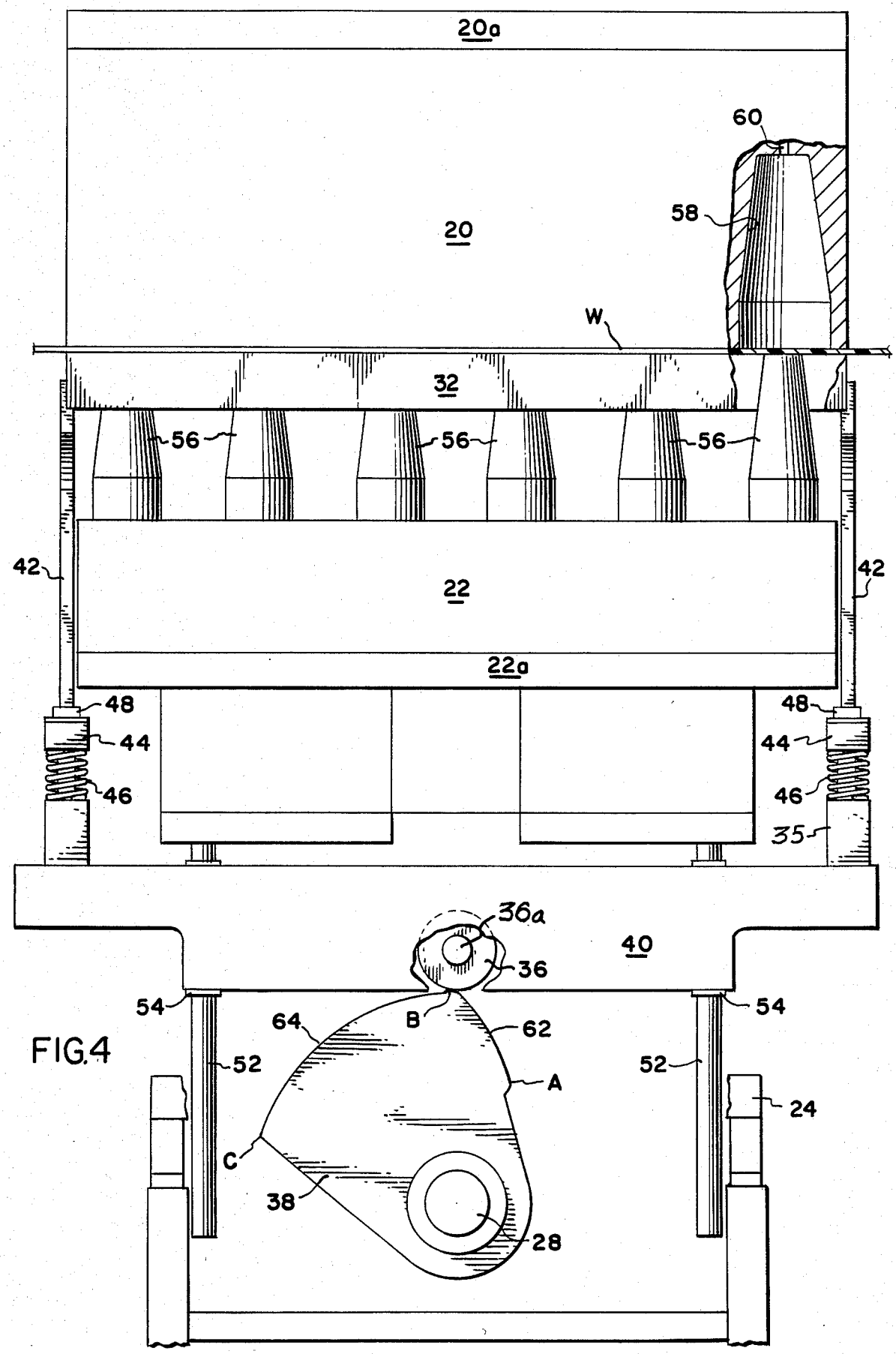
FIG. 4 is a side elevational view of the machine of FIG. 1, with certain parts broken away, or shown in section, showing the machine at an initial stage in the mold closing step.
Figure 5:
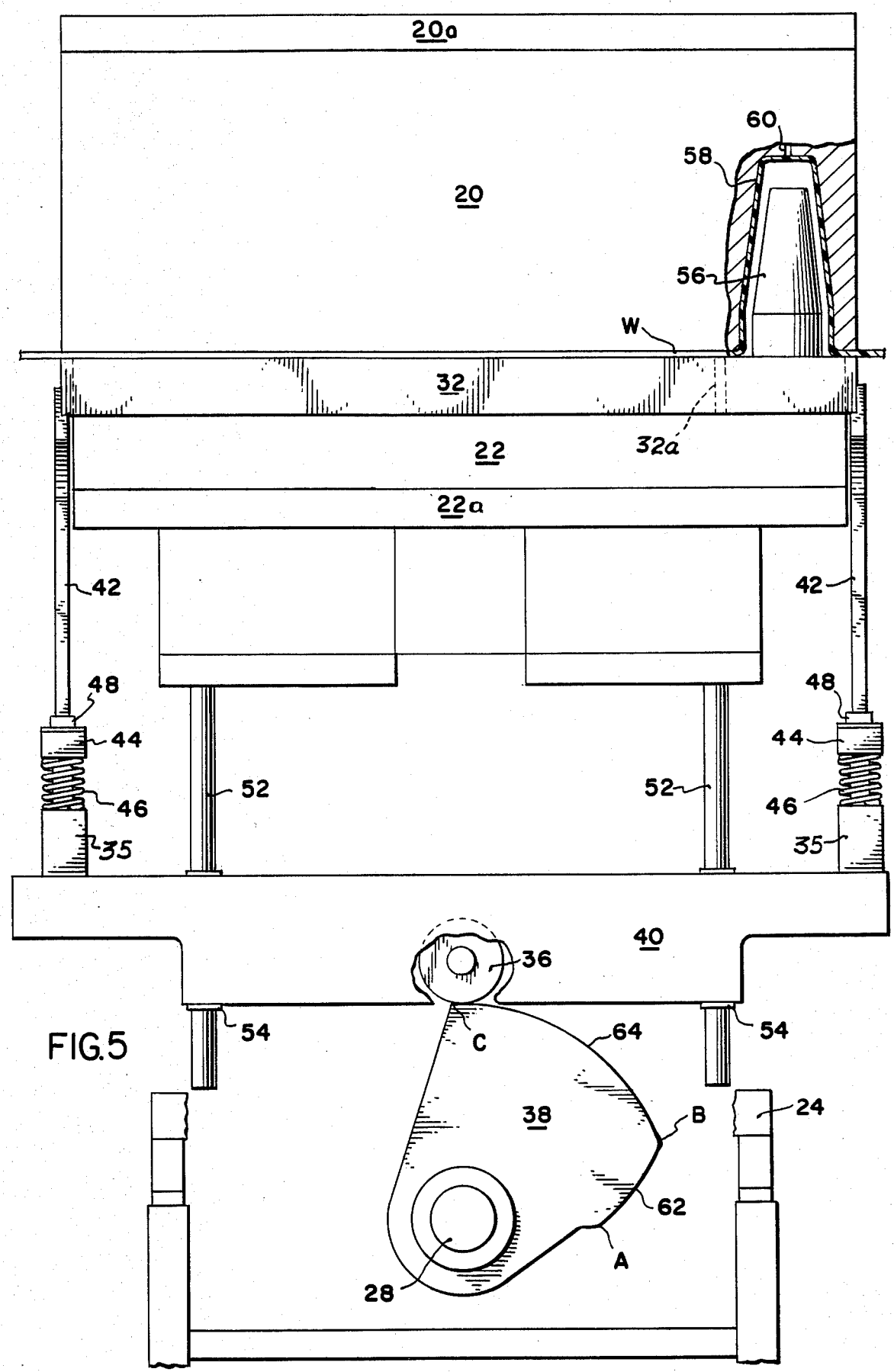
FIG. 5 is a side elevational view of the machine with certain parts broken away, or omitted, showing the molds in their fully closed position.

The clamp ring assembly, which includes clamping rings 32, support posts 42 and platforms 44, is thus able to move downwardly relative to rails 35 against the biasing action of the springs 46. As best seen in FIGS. 1, 4, and 5, assembly 34 is guided in vertical movement relative to lower mold platens 22a by a plurality of guide rods 52 which are fixedly secured to and project downwardly from lower mold platens 22a, and are slidably received in bushings 54 on bracket plates 40. Lower mold platen 22a and upper mold platen 20a are in turn guided in vertical movement relative to the machine frame by a plurality of fixed vertical posts 55 (FIG. 3) forming a part of the machine frame, see the aforementioned U.S. Pat. No. 4,255,382.

Referring now particularly to FIG. 4, it is seen that lower mold 22 is a male mold, and is provided with a plurality of upwardly projecting plug assist members 56 (only some being shown for the sake of convenience) which are respectively vertically aligned with a plurality of mold cavities 58 in upper mold 20, the cavities 58 projecting upwardly from the lower face of upper mold 20. Each cavity 58 is conventionally provided with vacuum ports 60 which may, in a well known manner, be selectively connected to a vacuum source at an appropriate point in the mold actuating cycle to draw the material of web W firmly against the interior wall of the mold cavity.

The configuration of cam 38, which controls the actuation of the web clamping mechanism, is best seen in FIGS. 1, 4, and 5. As previously stated, drive mechanism 26 oscillates rock shaft 28 back and forth through an arc about the rock shaft axis. The rotary amplitude of this oscillation is represented by an arc of approximately 90°, the actual extent of the arc being such that that portion of the periphery of each cam 38 between point A and point C ismoved back and forth beneath the associated cam follower roller 36 as shaft 28 is oscillated. In FIG. 1, roller 36 is substantially in engagement with point A on the periphery of the cam 38, and this represents one end limit of rotary oscillation of shaft 28, while FIG. 5 shows the rock shaft and cam 38 at the opposite end limit of oscillation of shaft 28.

Referring now to FIG. 1, rock shaft 28 is shown substantially at its end limit of movement of rotation in a counterclockwise direction and will, upon further action of drive mechanism 26, be driven in a clockwise direction from the position shown in FIG. 1. Referring now to the cam periphery, it will be noted that that portion of the cam periphery 62 between points A and B, rapidly increases in its radial distance from the axis of rock shaft 28 between the points A and B. Thus, as shaft 28 rotates from the FIG. 1 position, cam follower rollers 36 will be driven upwardly from the FIG. 1 position, thus elevating base plate 34 and hence clamping ring 32 from the position shown in FIG. 1.

In FIG. 4, the cams 38 have been rotated to a position where follower rollers 36 are at point B of the cam periphery, and it will be noted that at this time, clamping ring 32 has engaged the web W and is pressing this web against the lower surface of upper mold 20. Movement of upper mold 20 and lower mold 22, which is controlled in a conventional manner by the oscillation of rock shaft 28, (see U.S. Pat. No. 4,255,382) is coordinated with motion of the clamping ring such that plug assist members 56 of the lower mold are just moving upwardly into engagement with the web W as the web is clamped by clamp ring 32 against the lower surface of upper mold 20.

Further oscillation of rock shaft 28 in a clockwise direction from the FIG. 4 position carries that portion of the cam periphery 64 which is between points B and C on the cam beneath the associated follower roller 36. The peripheral portion 64 of cam 38 is of constant radius from the rock shaft axis, hence the clamping ring and remaining parts of the clamp assembly in general remain in the FIG. 4 position as the rock shaft rotates in a clockwise direction from the position shown in FIG. 4 to that shown in FIG. 5.

FIG. 5 shows molds 20 and 22 in their fully closed position. Note that plug assist member 56 is fully projected into its associated upper mold cavity 58 and thematerial of web W has been vacuum formed to the configuration of mold cavity 58. It will also be noted from FIG. 5 that the lower surface of upper mold 20 projects outwardly slightly beyond the associated upper surface of lower mold 22 and that this outer projection provides part of the surface against which clamping ring device 32 clamps web W.

FIG. 5 shows rock shaft 28 at its extreme clockwise limit of rotary oscillation, and further driving action from drive mechanism 26 will cause rock shaft 28 to move in a counterclockwise direction from the FIG. 5 position and hold clamp 32 against web W during a stripping of the parts formed from cavities 58, and then back through the FIG. 4 position to the FIG. 1 position in coordination with opening movement of the two molds.

When clamping ring 32 is in the clamping position shown in FIGS. 4 and 5, its vertical dimensions are chosen to be such that springs 46 are only slightly compressed and the upper edge of the clamping ring device is firmly seated against the web to clamp it to the upper mold. While an adequate clamping force is thus achieved, the load on the drive mechanism necessary to maintain this clamped relationship is not substantial, in that the clamping position is positively maintained by the support of the follower rollers 36 on the constant radius portions 64 of their associated cams.

While one embodiment of the invention has been described in detail, it will be apparent to those skilled in the art of disclosed embodiment may be modified. Therefore, the foregoing description is to be considered exemplary rather than limiting, and the true scope of the invention is that defined in the following claims.

What is claimed is:

1. In a differential pressure forming machine for forming articles in a web of thermoplastic material, said machine having a frame, a male mold and a female mold mounted on said frame for relative movement toward and away from each other, drive means including a rock shaft mounted on said frame for cyclically moving said molds toward and away from each other between a mold closed position wherein said molds are in opposed adjacent face-to-face relationship with each other and a mold open position wherein said molds are in spaced relationship to each other, said female mold having mold cavity defining means therein located within a given area on the face of said female mold facing said male mold, and said male mold having plug assist means adapted to project into said cavity means when said molds are in said mold closed position, means synchronized with said drive means for positioning an unformed section of a web of thermoplastic material between said molds when said molds are in said mold open position, and clamping means for clamping said section of said web against saidface of said female mold around the perimeter of said given area upon movement of said molds from said mold open position; the improvement wherein said clamping means comprises clamping ring means mounted on said frame for movement independently of said molds to and from a clamping position wherein said ring means is operable to clamp said web against said face of said female mold around the perimeter of said given area, and cam means mounted on said rock shaft engageable with cam follower means coupled to said clamping ring means for driving said clamping ring means to and from said clamping position in movement synchronized with the opening and closing of said molds.

2. The invention defined in claim 1 wherein said means coupled to said clamping ring comprises a plate, cam follower means on said plate engaged with said cam means, and resilient means mounting said clamping ring on said plate.

3. The invention defined in claim 1 wherein said cam means comprises a cam fixedly mounted on said rock shaft and having a cam surface which includes a first cam follower engaging section lying at a constant radius from the axis of said rock shaft for maintaining said clamping ring means in said clamping position throughout a first angular segment of the rotary oscillation of said rock shaft, and a second cam follower engaging section on said cam surface lying at varying radii from said axis less than said constant radius for shifting said clamping ring means to and from said clamping position as said rock shaft is oscillated through the remaining angular segment of its range of rotary oscillation.

4. The invention defined in claim 1 wherein said female mold is mounted on said frame with said face thereof facing downwardly and said drive means raises said male mold to and lowers said male mold from said mold closed position, said clamping ring means including a base plate mounted for vertical reciprocatory movement on said frame independently of said male and female molds below said male and female molds and overlying said cam means on said rock shaft, cam follower means on said plate overlying the axis of said rock shaft and operatively engaging said cam means, and a clamp ring mounted on said plate and having a central opening accommodating vertical movement of said male mold through said ring, said clamp ring operable to clamp said web against said face of said female mold when said clamping ring means is located in said clamping relationship.

5. The invention defined in claim 4 further comprising a plurality of support post means projecting upwardly from said base plate supporting said clamp ring in spaced relationship above said base plate.

6. The invention defined in claim 5 wherein said support post means include spring means biasing said clamp ring upwardly away from said base plate.

7. The invention defined in claim 4 wherein said cam means comprises a circumferential follower engaging section which is oscillated back and forth beneath said follower means upon rotary oscillation of said rock shaft, said section including a first portion at one end thereof of increasing radius from the rock shaft axis in its angular extent about said rock shaft axis from said one end of said section and merging with a second portion of a constant radius from said rock shaft axis, said second portion of said follower engaging section being operable, when engaged with said follower means, to maintain said ring in said clamping position.

8. In a differential pressure forming machine for forming articles in a web of thermoplastic material, said machine having a frame, a matching mold and a female mold mounted on said frame for relative opening and closing movement, drive means mounted on said frame for cyclically relatively moving said molds between a mold closed position wherein said molds are in opposed adjacent face-to-face relationship with each other and a mold open position wherein said molds are in spaced relationship to each other, said female mold having mold cavity defining means therein located within a given area on the face of said female mold facing said matching mold, means for positioning an unformed section of a web of thermoplastic material between said molds when said molds are in said mold open position, and clamping means for clamping said section of said web against said face of said female mold around the perimeter of said given area upon relative movement of said molds from said mold open position; the improvement wherein said clamping means comprises a sub frame, carrying clamping ring means, mounted on said frame for movement independently of said molds to and from a clamping position wherein said ring means is operable to clamp said web against said face of said female mold around the perimeter of said given area, and clamp means operating means, driven by said drive means, linked to said sub frame for driving said clamping ring means to and from clamping position in movement synchronized to and with the opening and closing of said molds; and spring means interposed between said sub frame and clamping ring means which is slightly compressed when said clamping ring means is driven to clamped position.

* * * * *